Oct. 18, 1966   D. A. MacKINNES KENNEDY   3,279,706
NUT ASSEMBLIES

Filed June 8, 1964   2 Sheets-Sheet 1

INVENTOR
Donald A.M. Kennedy
By Watson, Cole, Grindle & Watson
ATTORNEYS

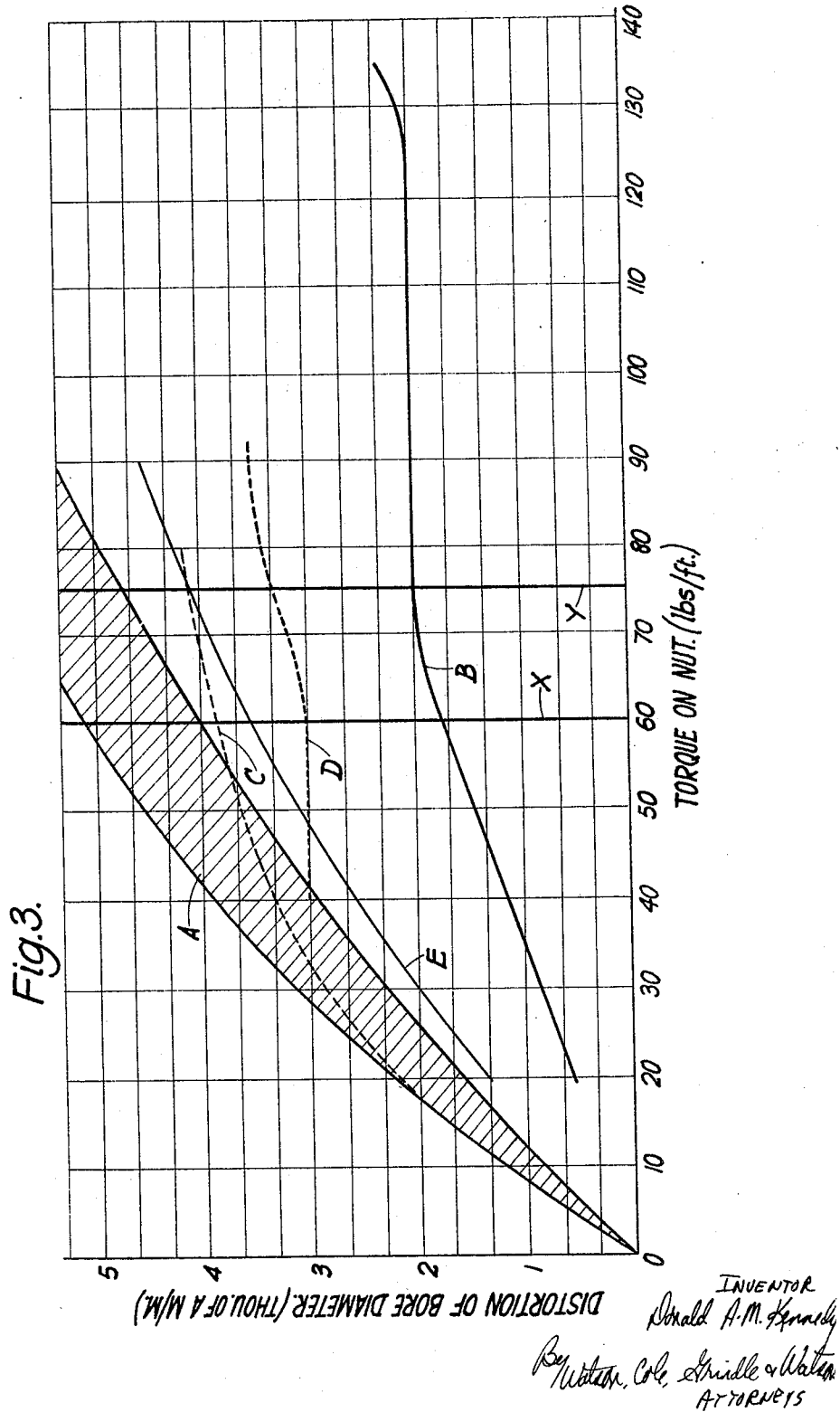

United States Patent Office 3,279,706
Patented Oct. 18, 1966

3,279,706
NUT ASSEMBLIES
Donald Allen MacKinnes Kennedy, London, England, assignor to Simms Motor Units Limited, London, England, a British company
Filed June 8, 1964, Ser. No. 373,291
Claims priority, application Great Britain, June 12, 1963, 23,400/63
3 Claims. (Cl. 239—533)

The invention relates to fuel injector assemblies.

The invention provides a fuel injector assembly comprising a body member; an injector nozzle; and a retaining member; the retaining member and the body member being screw-threaded for interengagement with each other with a part of the injector nozzle between them to secure the nozzle to the body member by a thrust transmitted from a surface on the retaining member to an adjacent surface on the injection nozzle; at least one layer of flowable metal being provided between the aforesaid two surfaces, whereby when the retaining member and the body are screwed together as aforesaid by the application of torque to one member relative to the other, the flowable metal is cause to flow and thereby to reduce the friction between the surfaces to reduce the torque transmitted from the retaining member to the injector nozzle.

The said layer or layers of flowable metal may be coated on one or both of the aforesaid adjacent surfaces.

Preferably a thin spacer member is interposed between the aforesaid adjacent surfaces, and includes the said layer or layers of flowable metal coated on one or both sides thereof. Preferably the spacer member is annular in shape.

Preferably the spacer member is of tempered spring steel coated as aforesaid.

Preferably the said flowable metal comprises cadmium, zinc, copper or tin or a mixture or alloy of two or more of those metals.

A specific embodiment of the invention will now be described by way of example and with reference to the accompanying drawings in which:

FIGURE 3 is a graph showing the variation of distortion of the bore of the injector nozzle with torque applied to the retaining member.

Figure 1:
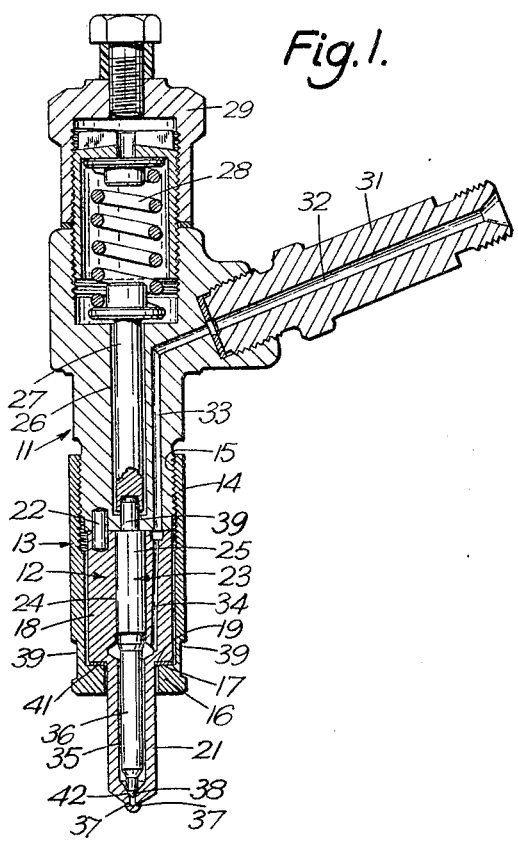
FIGURE 1 is a longitudinal view, partly in section, through a fuel injector assembly.
Figure 2A:
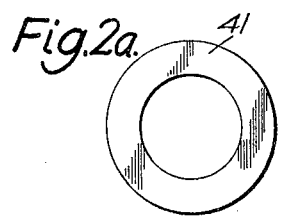
FIGURE 2a is a plan view and FIGURE 2b is a side view of an annular spacer member incorporated in the assembly.
Figure 2B:

The fuel injector assembly of this example is intended for use in an internal combustion engine. It comprises a generally cylindrical body member 11, a generally cylindrical injector nozzle 12 and a retaining member in the form of an elongated nut 13. The nut 13 is screw threaded at 14 at one end of its inner surface for interengagement with complementary threading 15 around the lower end of the body member. The other end of the nut has an inwardly extending annular flange 16, of which the annular surface 17 facing towards the thereading 14 is ground flat. The nozzle 12 has a shoulder 18, the annular surface 19 of which is adjacent to and faces the surface 17 and is also ground flat. The lower part 21 of the injector nozzle protrudes through the aperture defined by the annular flange 16. The upper end of the nozzle 12 abuts the lower end of the body member 11, from which protrude two dowels, one of which is shown at 22. These dowels fit into holes in the upper end of the nozzle to locate the nozzle on the body member and prevent relative rotation thereof when the nut 13 is rotated.

The nozzle 12 has a central cylindrical bore in which slides a needle valve 23. The upper part 24 of the bore and the adjacent upper part 25 of the needle valve are both accurately machined cylindrical so that there is a close sliding fit between them. The body member 11 also has a central bore 26 in which slides a stem 27. The upper end of the stem is pressed downwards by a compression spring 28 retained in the body member by a screw cap 29. A fuel connector 31 screwed to the body member has a conduit 32, which communicates with conduit 33 through the body member. A conduit 34 through the nozzle connects the conduit 33 with a space 35 around the lower part 36 of the needle valve. A number of fine holes 37 are provided in the bottom end of the nozzle.

The lower end of the stem 27 abuts a spigot 39 projecting from the top of the needle valve, so that the thrust of the spring 28 is transmitted to the needle valve so that its conical end 38 is pressed against a seating 42, and thus normally keeps the holes 37 sealed from the space 35. When fuel at a sufficiently high pressure is fed to the conduit 32 of connector 31, the fuel passes to the space 35 and raises the needle valve against the force of the spring 28 so that fuel is injected through the holes 37.

It is essential for the proper functioning of the injector assembly that the surfaces of the part 24 of the nozzle bore and the part 25 of the needle valve remain accurately cylindrical, so that the needle valve does not stick in the bore and so that fuel cannot leak under high pressure up the bore. The injector nozzle 12 is secured to the body member 11 by screwing the nut 13 onto the body member, a measured torque of between 60 lbs.-feet and 75 lbs.-feet being applied to the nut relative to the body. For this purpose flats 39 are provided on the nozzle. Axial thrust from the nut to the nozzle is transmitted through the surface 17 on the nut and the adjacent surface 19 on the nozzle. In this example, a thin spacer member in the form of a tempered spring steel washer 41 is positioned between these surfaces. The faces of the washer are coated with a thin layer of flowable metal, in this example cadmium metal. In this example, the washer is four thousandths of an inch thick and the thickness of the cadmium plating is a minimum of three ten-thousandths of an inch thick on each side of the washer. When the nut is tightened onto the body with a torque of about 60 to 75 lbs.-feet, the cadmium coating on or both sides of the washer flows under the stress applied to it. This reduces substantially the amount of torque transmitted from the annular surface 17 of the nut to the annular surface 19 on the nozzle, whilst still transmitting the axial thrust. If the flowable metal were not present, much more torque would be transmitted to the lower end of the nozzle. Since the upper end of the nozzle is prevented from rotating by the dowels 22, this high torque applied to one end of the nozzle relative to its other end would cause the nozzle to twist and its bore 24 to distort to such an extent that the needle valve sticks in the bore.

FIGURE 3 shows graphically the beneficial effect of the cadmium plated washer. In FIGURE 3, the change in diameter in thousandths of a millimetre of the diameter of the part 24 of the nozzle bore (which was initially six millimetres in diameter) is plotted against the torque in lbs.-feet applied to the nut.

The lines X, Y, show the normal limits (60 and 70 lbs.-feet) of torque applied to the nut.

The shaded area A shows the average characteristics for nozzles and nuts which have been degreased and assembled without any lubricant. It will be seen that a torque of 60 to 75 lbs.-feet produces a distortion of five thousandths of a millimetre. The curve B shows the characteristic of the example described above with a washer plated with cadmium on both sides. It will be seen that a torque of 60 to 75 lbs.-feet produces a distortion of only two-thousandths of a millimetre, i.e., less than half of the distortion without the cadmium plated washer. Furthermore, at torques greater than 75 lbs.-feet, the distortion does not increase, even if the torque were increased to 120 lbs.-feet.

For further comparison, FIGURE 3 also shows the characteristics obtained with various other lubricating materials (without any washer). Curve C shows the characteristic obtained when the surfaces 17 and 19 were lubricated with the grease commerically available under the name "Castrol Ball Race Grease." Curve D shows the characteristic obtained when using the type of oil known as "calibrating oil." Curve E shows the characteristic obtained with either the material known as "anti-scuffing paste" or the material known as "chemical black."

It will be seen that the use of the cadmium-coated washer of the example described above produces far less distortion of the bore than any of the other methods hereinbefore mentioned of lubricating the surfaces 17 and 19.

The invention is not restricted to the details of the foregoing example. For instance, instead of cadmium, the flowable metal layer or layers may comprise other metal, e.g., zinc, copper or tin, or a mixture or alloy of these. The flowable metal must however not only flow under stress in the way described above, but must also withstand the working temperature to which the injector is likely to be subjected—e.g., about 150° C. Consequently when copper is used it is annealed by this temperature, and softens so much that the layer collapses under the thrust of the nut. This may be permissible provided that the copper layer is sufficiently thin (e.g., less than ten-thousandths of an inch thick) that this reduction in thickness of the washer does not cause the nut to slacken.

The separate spacer member or washer may be omitted and the layer of flowable metal coated directly upon the surface 17 of the nut. This arrangement has been found to produce characteristics similar to those of the cadmium-coated washer of the above example, up to about 75 lbs.-feet torque. However above that torque the distortion of the bore rises sharply.

I claim:

1. A fuel injector assembly intended for use in an internal combustion engine, and comprising a generally cylindrical body member, a generally cylindrical injector nozzle and a retaining member in the form of an elongated nut, the nut being screw threaded at one end of its inner surface for interengagement with complementary threading around the lower end of the body member, the other end of the nut having an inwardly extending anular flange, of which the annular surface facing towards the threading is ground flat, the nozzle having a shoulder, the annular surface of which is adjacent to and faces the said surface of the washer and is also ground flat, the lower part of the injector nozzle protruding through the aperture defined by the annular flange, the upper end of the nozzle abutting the lower end of the body member, from which protrude two dowels which fit into holes in the upper end of the nozzle to locate the nozzle on the body member and prevent relative rotation thereof when the nut is rotated, the nozzle also having a central cylindrical bore in which slides a needle valve, the upper part of the bore and the adjacent upper part of the needle valve both accurately machined cylindrical so that one is a close sliding fit in the other, the body member also having a central bore in which slides a stem the upper end of which is pressed downwards by a compression spring retained in the body member by a screw cap, a fuel connector being screwed to the body member and having a conduit, which communicates with the conduit through the body member, a conduit through the nozzle connecting the conduit through the body member with a space around the lower part of the needle valve, a number of fine holes being provided in the bottom end of the nozzle, the lower end of the stem abuts a spigot projecting from the top of the needle valve, so that the thrust of the spring is transmitted to the needle valve so that its conical lower end is pressed against a seating and thus normally keeps the holes sealed from the space around the needle valve; whereby when fuel at a sufficiently high pressure is fed to the conduit of the connector, the fuel passes to the space around the needle valve and raises the needle valve against the force of the spring so that fuel is injected through the holes; the injector nozzle being secured to the body member by screwing the nut onto the body member, for this purpose flats being provided on the nozzle, axial thrust from the nut to the nozzle is transmitted through the surface on the nut and the adjacent surface on the nozzle a thin spacer member in the form of a tempered spring steel washer being positioned between these surfaces, the faces of the washer being coated with a thin layer of flowable cadmium metal, the washer being four thousandths of an inch thick and the thickness of the cadmium plating being a minimum of three ten-thousandths of an inch thick on each side of the washer, whereby when the nut is tightened onto the body with a torque of about 60 to 75 lbs.-feet, the cadmium coating on one or both sides of the washer flows under the stress applied to it, to reduce substantially the amount of torque transmitted from the annular surface of the nut to the annular surface on the nozzle, whilst still transmitting the axial thrust.

2. A fuel injector assembly comprising a body member and a retaining member, one of said members having an internally-threaded socket portion, and the other of said members having an externally-threaded portion operatively received in said internally-threaded socket portion, said members being relatively rotatable about the axis of their respective threaded portions, an injector nozzle member having a part thereof disposed in said socket and connected to said body member for relative rotation therewith, said part having an abutment face for receiving an axial thrust from the retaining member toward the body member, the retaining member having an abutment face in said socket for applying said thrust, a member resistant to the said thrust interposed between said abutment faces, said member comprising a rigid washer of tempered spring steel interposed between said abutment faces, said washer having relatively-opposed flat faces and a thin surface layer of flowable metal on each of said flat faces, said abutment faces and said thrust resistant member constituting the sole means transmitting substantial axial thrust from said retaining member to the nozzle member, whereby when the retaining member and the body member are screwed together the flowable metal is caused to flow and thereby to decrease any tendency of twisting distortion of the nozzle member, said nozzle member being held tightly in position against the body member by axial thrust transmitted through said thrust-transmitting member from the retaining member, during operation of the said fuel injector assembly.

3. A fuel injector assembly as defined in claim 2, in which said flowable metal is cadmium.

References Cited by the Examiner

UNITED STATES PATENTS

| 2,077,938 | 4/1937 | Kuttner | 239—533 |
| 2,552,679 | 5/1951 | Hogeman | 239—533 |

FOREIGN PATENTS

| 461,546 | 1/1951 | Italy. |

EVERETT W. KIRBY, *Primary Examiner.*